United States Patent
Cerny et al.

[11] Patent Number: 6,130,437
[45] Date of Patent: Oct. 10, 2000

[54] SENSOR AND DETECTION SYSTEM HAVING WIDE DIVERGING BEAM OPTICS

[75] Inventors: Mark Cerny, Cupertino; Hans Bartunek, Mountain View, both of Calif.

[73] Assignee: Hama Sensors, Inc., Golden Valley, Minn.

[21] Appl. No.: 09/066,645

[22] Filed: Apr. 24, 1998

[51] Int. Cl.[7] .................................................. G01N 21/86
[52] U.S. Cl. .................. 250/559.4; 250/559.47; 414/936; 356/375
[58] Field of Search ................. 250/559.4, 559.36, 250/559.29, 559.47, 559.48, 222.1; 356/375, 139.1; 414/936

[56] References Cited

U.S. PATENT DOCUMENTS

| | | | |
|---|---|---|---|
| Re. 34,749 | 10/1994 | Leong et al. | 250/237 G |
| 4,467,251 | 8/1984 | Jönsson | 318/480 |
| 4,786,126 | 11/1988 | Kramer . | |
| 5,003,188 | 3/1991 | Igari . | |
| 5,187,361 | 2/1993 | Ishii | 250/222.1 |
| 5,225,691 | 7/1993 | Powers et al. . | |
| 5,418,382 | 5/1995 | Blackwood et al. . | |
| 5,504,345 | 4/1996 | Bartunek et al. | 250/559.4 |

FOREIGN PATENT DOCUMENTS

| | | |
|---|---|---|
| 56-4079 | 1/1981 | Japan . |
| 62-195789 | 12/1987 | Japan . |
| 10-160683 | 6/1998 | Japan . |
| 11-145256 | 5/1999 | Japan . |

*Primary Examiner*—Que T. Le
*Assistant Examiner*—Thanh X. Luu
*Attorney, Agent, or Firm*—Patterson, Thuente & Skaar, P.A.

[57] ABSTRACT

A sensor and detection system is included. The sensor includes at least one transmitter which has associated optical elements for emitting at least one light beam toward the object to be detected. At least one receiver is positioned adjacent the transmitter for receiving light reflected from an edge of the object. The receiver generates a signal responsive to the reflected light. The associated optical elements of the transmitter include a converging lens for emitting a focused light beam in one plane, and a cylindrical lens for emitting a diverging light beam in another plane, such that a portion of the reflected light is diverging and is received by the receiver over a wide angle of coverage.

33 Claims, 3 Drawing Sheets

SENSOR AND DETECTION SYSTEM HAVING WIDE DIVERGING BEAM OPTICS

FIELD OF THE INVENTION

The present invention relates generally to a sensor and detection system for detecting the presence or position of surfaces, and more particularly to a sensor and detection system having wide diverging beam optics for increasing the angle of detection coverage.

BACKGROUND OF THE INVENTION

Sensors are used for a variety of purposes. One useful purpose is as an detection system for detecting the presence of objects. In particular it has been found to be difficult to detect the edge of objects, or objects with small, specular surfaces. A sensor and detection system and method which solves this problem is taught in U.S. Pat. No. 5,504,345, which is owned by assignee, and is herein incorporated by reference. The '345 patent discloses a semiconductor wafer and magnetic disk edge detection system having converging dual-beam optical sensor. The sensor comprises at least two light sources, and at least two light detectors. The light sources, or the light beams emanating form the sources, are spatially oriented such that the focal point of the converging light beams define a focal or inspection plane and converge at a single point external to the sensor. When the object interrupts the beam at or near the focal point of the light sources, it causes the light to be reflected backwards toward the sensor by the light detectors. The light detectors are spatially arranged so they can receive the light reflected.

The '345 patent teaches a very useful device, however it would be useful to increase the angle of coverage of the sensor. When the light strikes the object and is reflected backwards there is a certain angle associated with the return path of the reflected light. It is possible for light to be reflected in a vicinity remote from the light detectors. This results in a "blind spot" where the light is not detected. Thus, it is desirable to provide a sensor and detection system that exhibits improved coverage and substantially eliminates blind spots.

OBJECTS AND SUMMARY OF THE INVENTION

Accordingly, it is an object of the present invention to provide a sensor and detection system with improved angle of coverage.

More specifically, it is an object of the present invention to provide a sensor and detection system having wide diverging beam optics.

Another object of the present invention is to provide a sensor and detection system capable of detecting the edge of objects, particularly objects having small, specular or reflective surfaces.

Still another object of the present invention is to provide a sensor and detection system capable of detecting the edge of an object where the edge is at an angle of incidence that deviates significantly from the position which would generate ideal reflection to the receiver.

These and other objects, features and advantages of the invention are achieved by the sensor and detection system of the present invention, comprising at least one transmitter having associated optical elements for emitting at least one light beam toward the object to be detected. At least one receiver is positioned adjacent the transmitter for receiving light reflected from an edge of said object when said object intersects the one light beam. The receiver generates a signal responsive to the reflected light. The associated optical elements of the transmitter include a converging lens for emitting a focused light beam in one plane, and a cylindrical lens for emitting a diverging light beam in a perpendicular plane, such that a portion of the reflected light is diverging and is received by the receiver over a wide angle of coverage.

In an alternative embodiment of the present invention, a detection system is provided which comprises the sensor as described above, and includes means for causing relative movement between the object and the at least one transmitter, and a position encoder for providing proximity and location data responsive to the signal, thereby detecting the object.

BRIEF DESCRIPTION OF THE DRAWINGS

The foregoing and other objects, features and advantages of the invention become apparent upon reading of the detailed description of the invention provided below and upon reference to the drawings, in which.

DETAILED DESCRIPTION OF THE INVENTION

Figure 1:
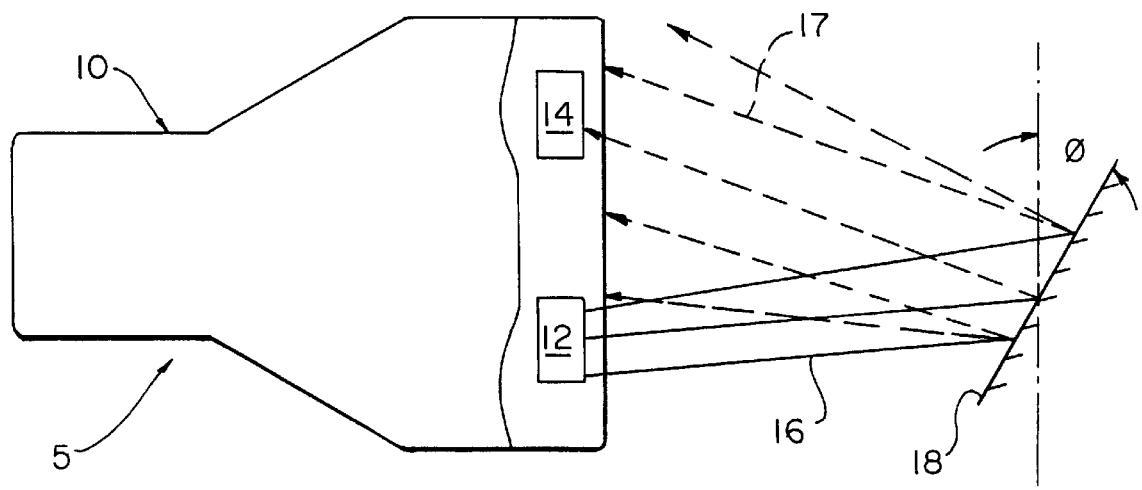
FIG. 1 is a partially cut away top plan view of the sensor according to one embodiment of the present invention.
Figure 2:
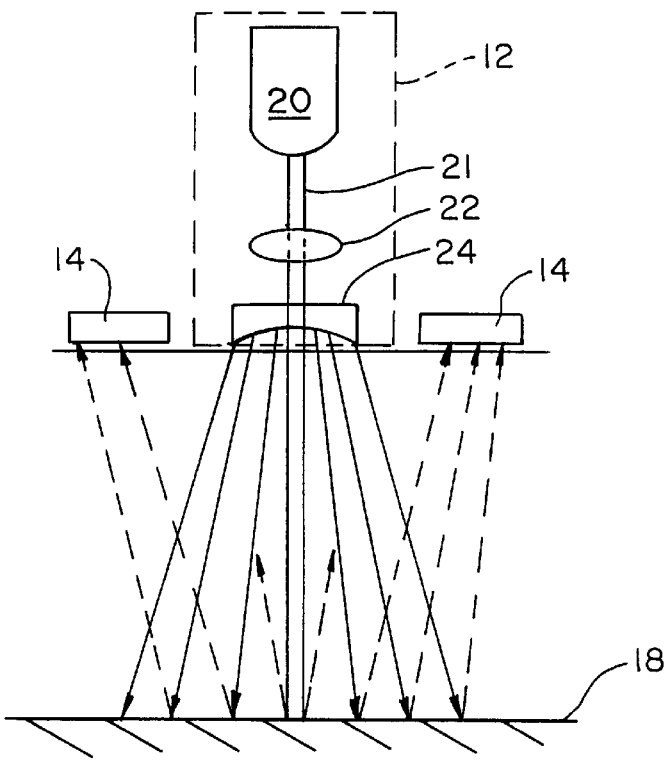
FIG. 2 is a schematic diagram showing the light beam and optics of the present invention in greater detail.

Turning to the drawings, wherein like components are designated by like reference numerals, FIGS. 1 and 2 are two views of the sensor and detection system of the present invention. FIG. 1 shows a sensor 5 comprising a housing 10 and wherein the housing 10 contains at least one transmitter 12 and at least one receiver 14. The transmitter 12 and receiver 14 are spaced apart from each other, and are mounted on a printed circuit board (not shown) within the sensor housing 10.

The transmitter 12 emits light 16 which is directed towards the object 18 to be detected. The light is reflected off the object 18 back towards the receiver 14.

The receiver 14 is a light detector and is spaced apart from the transmitter for receiving the reflected light 17. It is important to note that a plurality of receivers and transmitters may be used, however, the present invention is also capable of increasing the range of accurate detection and measurement using just one transmitter and receiver pair. Also, the placement of the transmitters and receivers may vary. For example, two transmitters may be placed directly next to one another, with the receivers placed on the other side of each of the transmitters. Alternatively, the transmitter and receiver may be placed in alternating position (such as one receiver, one transmitter, one receiver, and so on). In the preferred embodiment the sensor comprises three receivers and two transmitters, in alternating position.

Figure 3:
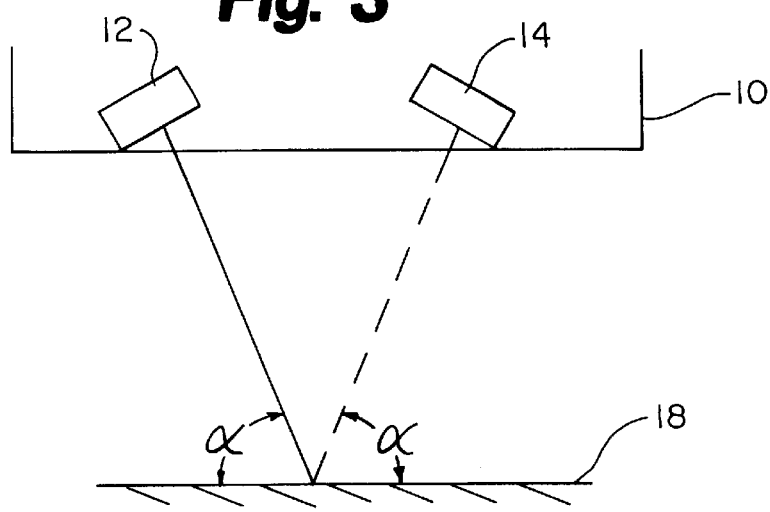
FIG. 3 is a schematic diagram of the sensor showing the case of ideal reflection back to the receiver.

Of particular advantage, the sensor employs a special optical arrangement that provides for detection of objects over a greater angle of coverage. That is, the sensor is capable of detecting objects that have a highly curved or specular surface, and/or are present at an angle that deviates significantly from the position which would generate ideal reflection to the receiver. The case of direct, or ideal, reflection is shown in FIG. 3. In FIG. 3, the maximum possible amount of the reflected light received is being receiver by the receiver 14. The optical arrangement of the present invention is shown in more detail with reference to FIG. 2. The transmitter 12 includes a light source and associated optics. The light source 20 emits a light beam 21. Preferably, the light source 20 is a laser having a laser driver circuit and at least one laser (both not shown). The light 21 emitted from the light source 20 is projected onto a converging lens 22. The converging lens 22 focuses the light. Of particular advantage, after the light passes through the converging lens 22, the light is directed to a cylindrical lens 24. According to the present invention, the cylindrical lens is a diverging lens which diverts the light only in one plane. For purposes of description, we shall define this plane as the "horizontal," or x-axis plane. For instances where the objects to be detected are intended to lie within parallel planes, this horizontal plane is parallel to said parallel planes. In the perpendicular plane, i.e. the "vertical" or y axis plane, the light is unaffected and not diverted, and remains focused. Thus, the light that exits the transmitter is diverging in one plane, and focused in another (or perpendicular) plane. Preferably, the cylindrical lens is a negative plano-cylindrical lens.

The diverging light in the horizontal plane provides a wide angle of coverage. That is, when light strikes the object, it is reflected backwards toward the sensor. If the light reflects back in the area of a receiver, the light will be detected by the receiver and then detection and position measurements occur. However, if the object is highly specular and/or curved, or is present at an angle, the light being reflected back toward the sensor may be in an area away from the receiver, and thus the reflected light is not detected. To increase the range of detection by the receiver, the diverging light beam is employed by the present invention. Since the beam is diverted in one plane, a wider light beam strikes the object and this causes a wider beam of reflected light back to the sensor. In other words, in the one plane, i.e. the horizontal plane, or the plane that is parallel to the object, the light is diverted so that when the light strikes the object, even if the object is at an angle, some portion of the light will be received at the receiver. This prevents the potential problem that light reflecting back may miss the receiver. This wider beam of reflected light increases the range that the reflected light will be detected by one of the receivers 14. The reflected light will be reflected back toward the receivers at the same angle as the incoming, or incident light.

In the vertical, or y axis plane, the light from the transmitter 12 is focused and is spatially oriented such that the focused beam from the light source converges to a single focal point, external to the sensor 5 (note this is not shown in the top view). This focal point defines an inspection plane. When the object 18 to be detected interrupts the beam at or near the focal point of the light source, it causes the light to be reflected backwards towards the sensor for detection by the receiver 14. The receiver 14 generates a signal from the received light by conventional digital signal processing techniques, and this signal is then used to determine detection of the object, its location and the like. Thus, it is shown that the present invention provides a sensor and detection system wherein at one plane or axis, there is a diverging beam which provides for the receiver to "see" the object over a wide angle; while in the other plane or axis the beam is focused which promotes precise detection of the object.

Figure 4:
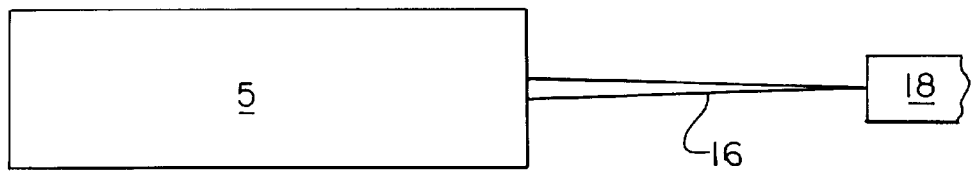
FIG. 4 is a side view of the sensor of the present invention.
Figure 5:
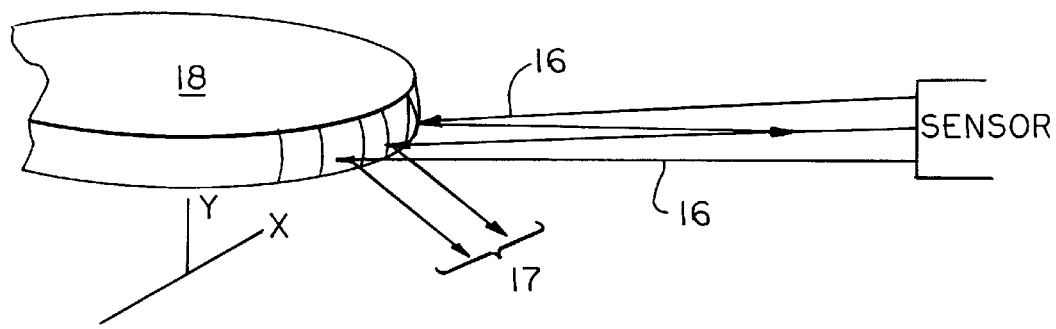
FIG. 5 is a perspective side view of an object to be detected by the sensor of the present invention showing the light striking the surface of the object in the x and y planes.

FIG. 4 shows a side view of the sensor wherein the light is focused. As illustrated, in this plane or axis, the beam is focused for precise detection of the object. The advantage of providing diverging light and focused light is further illustrated in FIG. 5. FIG. 5 shows an object 18 having a curved or specular surface, such as a semiconductor wafer. Light is emitted from the sensor 5 toward the object 18. In this instance where the surface of the object is collinear to the centerline of the light beam, the light is reflected directly back to the sensor 5. However, the present invention is also capable of detecting light reflected from the curved edges of the object. The wide diverging light emitted from the sensor is diverted in the x-axis, and as shown, strikes the object at various points along the object's curved surface which lies in the plane of the x-axis. The light is then reflected back towards the sensor's receivers thereby providing a wide angle of coverage. The angle of coverage is considered wide as compared to the angle of the reflected light that is reflected from a focused beam. Now, looking at the vertical plane (i.e. the perpendicular or y-axis) the sensor provides for a focused light beam in this plane. This promotes very accurate detection by the sensor. For example, to detect the location of the top and bottom surfaces of the object 18, the sensor and focused beam can be moved in the vertical plane to locate the top and bottom surfaces. Thus, while the light in the horizontal plane is diverted giving a wide angle of coverage, the light is focused in the vertical plane thereby providing accurate detection.

Figure 6:
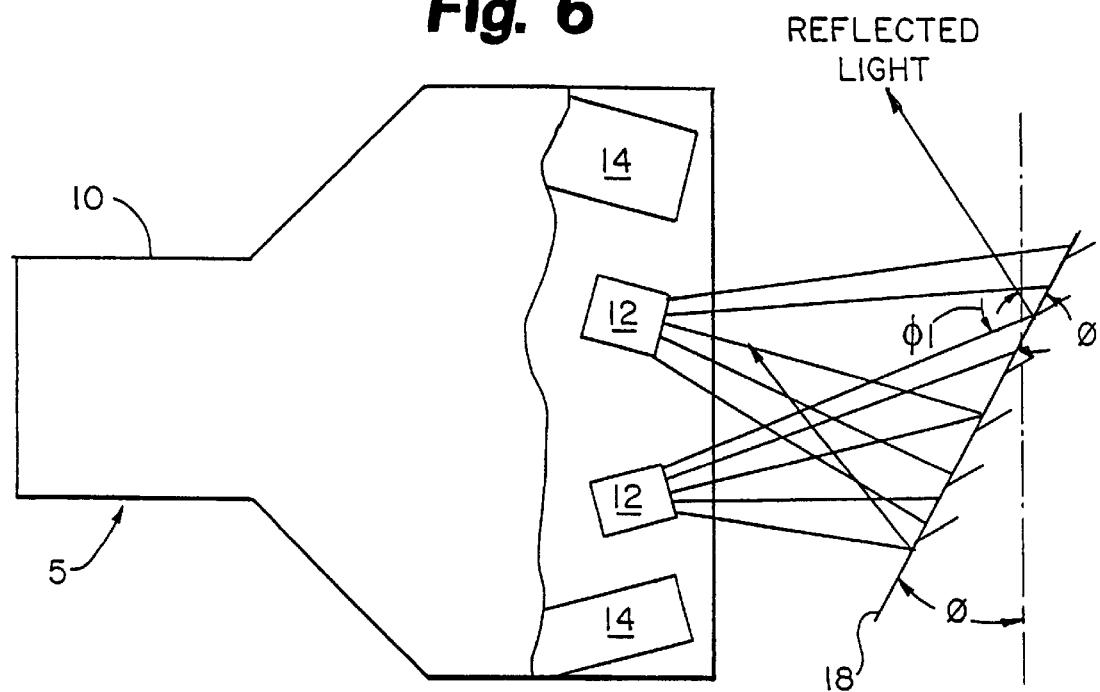
FIG. 6 is a partially cut away top plan view of the sensor according to a second embodiment of the present invention and shows how the sensor of the present invention may detect an object that is present at an angle of incidence that deviates significantly from position which would generate ideal reflection to the receiver.

FIG. 6 shows an alternative embodiment of the invention employing a plurality of transmitters and receivers. Preferably, the sensor comprises two transmitters 12 and three receivers 14, in alternating positions for extending the coverage of the sensor. When two or more transmitters are used, each transmitter emits a focused light beam in the vertical plane, and these converging light beams are spaced apart such that the focal point of the converging light beams define a focal or inspection plane and converge as a single point external to the sensor. Relative motion of the object and sensor occurs, and then the object to be detected interrupts the beam at or near the focal point of the two light sources, it causes the light to be reflected backwards towards the sensor for detection by the receivers. As shown, the light will be reflected back at an angle $\phi 1$ that is the same angle as that of the incoming or incident light. As stated above, the receivers 14 then generate signals responsive to the reflected light, and these signals are then processed to provide detection and location data.

Figure 7:
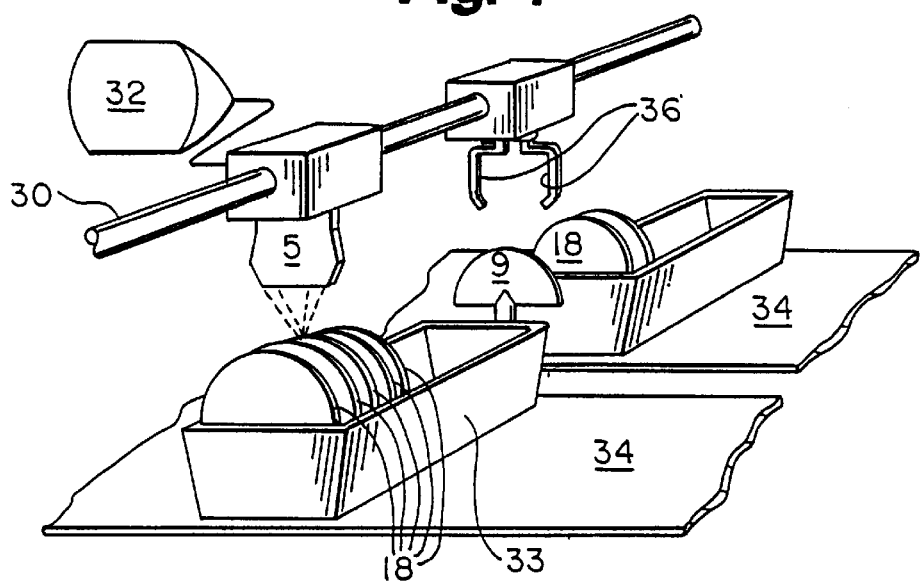
FIG. 7 is a diagram of an detection system in accordance with the present invention.

In an alternative embodiment of the invention, a detection system is provided. Referring to FIG. 7, an example of the detection system is illustrated. The detection system includes a sensor 5 which is preferably mounted on a movable arm 30, such as a motor arm, or a robotic arm. The sensor 5 is directed toward objects 18 to be detected and/or located, and may be moved from one end of the objects to the other by the movable arm 30. The objects 18 may be mounted in a tray 33 and placed on moving means 34, such as a transfer table or conveyor. Operatively coupled to the sensor is an encoding means 32, such as an optical encoder and the like. The encoding means 32 receives a signal from the sensor 5 and generates the desired data. The encoding means 32 may employ various encoding algorithms known in the art to determine position and/or location of the object 18. A transporter 36, such as a robotic arm, may also be mounted to the movable arm for transporting objects 18 to and from the carrier 33.

Thus, an improved sensor and detection system has been provided. The foregoing description of specific embodiments of the invention have been presented for the purpose of illustration and description. They are not intended to be exhaustive or to limit the invention to the precise forms disclosed, and obviously many modifications, embodiments, and variations are possible in light of the above teaching. It is intended that the scope of the invention be defined by the claims appended hereto and their equivalents.

What is claimed:

1. A sensor for detecting an edge of a substantially flat object, the sensor comprising:
    at least one transmitter for emitting at least one respective light beam toward the edge of said substantially flat object to be detected; and
    at least one receiver for receiving light reflected from the edge of said substantially flat object when said object intersects the at least one light beam, and for generating a signal responsive to the light reflected from the edge of said substantially flat object;
    wherein the at least one transmitter is constructed to emit a converging, focused light beam in a first plane for precise detection of said object, said focused light beam being a diverging light beam in a second plane, such that a portion of the reflected light is diverging and is received by the receiver over a wide angle of coverage; wherein said first plane is disposed at an angle to said second plane.

2. The sensor of claim 1 wherein the at least one transmitter comprises a converging lens and a cylindrical lens.

3. The sensor of claim 2 wherein the cylindrical lens is a negative plano cylindrical lens.

4. The sensor of claim 1 wherein the signal is processed by digital signal processing.

5. The sensor of claim 1 wherein said sensor comprises two transmitters and three receivers, the transmitters being spaced apart and with one of said receivers located on each side of the transmitters, wherein the receivers receive light emitted from either of the transmitters that is reflected from the object.

6. The sensor of claim 1 wherein the sensor is for detecting multiple objects lying within parallel planes.

7. The sensor of claim 1 wherein the object is present at an angle that deviates significantly from a position which would generate ideal reflection to the receiver.

8. The sensor of claim 1 further comprising:
    means for causing relative movement between the object and the at least one transmitter; and
    position encoding means for providing proximity and location data responsive to said signal.

9. The sensor of claim 8 wherein the means for causing relative movement between the object and the at least one transmitter is selected from the group of a motor arm, robotic arm, conveyor belt, transfer table, a disk indexing system, by hand, and combinations thereof.

10. The sensor of claim 1, wherein said first plane is disposed at a substantially perpendicular angle to said second plane.

11. The sensor of claim 1, wherein said diverging light beam is an undivided light beam.

12. The sensor of claim 1, wherein said substantially flat object is substantially parallel to said second plane.

13. The sensor of claim 1, wherein the at least one transmitter comprises a first lens constructed to emit the focused light beam in the first plane, and a second lens constructed to emit the diverging light beam in the second plane.

14. The sensor of claim 1, wherein said converging, focused light beam converges to a focal plane.

15. The sensor of claim 14, wherein the focal plane is substantially perpendicular to the first plane and the second plane.

16. The sensor of claim 1, wherein said converging, focused light beam converges along its entire extent in the first plane.

17. A detection system for detecting an edge of a substantially flat object, the detection system comprising:
    at least one transmitter having associated optical elements for emitting at least one respective light beam toward the edge of said substantially flat object to be detected;
    moving means for causing relative movement between the object and the at least one transmitter;
    at least one receiver for receiving light reflected from the edge of said substantially flat object when said object intersects the at least one light beam, and for generating a signal corresponding to the light reflected from the edge of said substantially flat object; and
    a position encoder for providing position information of the object responsive to the signal;
    wherein the associated optical elements include means for emitting a converging, focused light beam in a first plane for precise detection of said object, said focused light beam being a diverging light beam in a second plane perpendicular to the first plane, such that a portion of the reflected light is diverging in said second plane and is received by the receiver over a wide angle of coverage in said second plane.

18. The detection system of claim 17 wherein the means for emitting comprises a converging lens and a cylindrical lens.

19. The detection system of claim 18 wherein the cylindrical lens is a negative plano-cylindrical lens.

20. The detection system of claim 17 wherein the signal is processed by digital signal processing, in cooperation with position encoding means to provide information of the object's proximity and location.

21. The detection system of claim 17 wherein said sensor comprises two-transmitters and three receivers, the transmitters being spaced apart and with one of said receivers located on each side of the transmitters, wherein the receivers receive light emitted from either of the transmitters that is reflected from the object.

22. The detection system of claim 17 wherein the detection system is for detecting multiple objects lying within parallel planes.

23. The detection system of claim 17 wherein the object is present at an angle that deviates significantly from a position which would generate ideal reflection to the receiver.

24. The detection system of claim 17 wherein the moving means is selected from the group of a motor arm, robotic arm, conveyor belt, transfer table, a disk indexing system, by hand, and combinations thereof.

25. The detection system of claim 17, wherein said diverging light beam is an undivided light beam.

26. The detection system of claim 17, wherein said converging, focused light beam converges to a focal plane.

27. The detection system of claim 26, wherein the focal plane is substantially perpendicular to the first plane and the second plane.

28. The detection system of claim 17, wherein said converging, focused light beam converges along its entire extent in the first plane.

29. A detection system for detecting an edge of a substantially flat object, the detection system comprising:

at least one transmitter having associated optical elements for emitting at least one respective light beam toward the edge of said substantially flat object to be detected, said at least one respective light beam being diverging in one optical axis which defines an inspection plane, and said at least one light beam being a converging focused light beam in a second optical axis, the beam in said second optical axis being focused to a predetermined point along said second optical axis;

moving means for causing relative movement between the object and the at least one transmitter;

at least one receiver for receiving light reflected from the edge of said substantially flat object when said object intersects the inspection plane, and for generating a signal corresponding to the received light; and a position encoder for providing position information of the object responsive to the signal;

wherein said at least one light beam strikes the edge of said substantially flat object in said one optical axis such that a portion of the reflected light is diverging and is received by the receiver over a wide angle of coverage; further wherein said at least one light beam strikes the edge of said substantially flat object in said second optical axis for precise detection of said object.

30. The detection system of claim 29, wherein said at least one light beam is an undivided light beam.

31. The detection system of claim 29, wherein said converging, focused light beam converges to a focal plane.

32. The detection system of claim 31, wherein the focal plane is substantially perpendicular to said one optical axis and said second optical axis.

33. The detection system of claim 29, wherein said converging, focused light beam converges along its entire extent in the second optical axis.

* * * * *

UNITED STATES PATENT AND TRADEMARK OFFICE
CERTIFICATE OF CORRECTION

PATENT NO : 6,130,437

DATED : October 10, 2000

INVENTOR(S) : Cerny, et al.

It is certified that error appears in the above-identified patent and that said Letters Patent are hereby corrected as shown below:

Column 3, line 14, "receiver" has been changed to --received--.

Column 6, line 44, --the-- has been inserted after "with".

Column 6, line 45, "encoding means" has been changed to --encoder--.

Column 6, line 47, "sensor" has been changed to --detection system--.

Column 6, line 48, "two-transmitters" has been changed --two transmitters--.

Signed and Sealed this

Eighth Day of May, 2001

*Attest:*

NICHOLAS P. GODICI

*Attesting Officer*    *Acting Director of the United States Patent and Trademark Office*